United States Patent [19]

Fujii et al.

[11] 3,741,994

[45] June 26, 1973

[54] VAT DYES

[75] Inventors: Fumio Fujii; Koji Kurahara; Akitoshi Igata; Nobuyoshi Abe; Tetsuo Yamamoto, all of Omuta, Japan

[73] Assignee: Mitsui Toatsu Chemicals, Incorporated, Tokyo, Japan

[22] Filed: Apr. 7, 1970

[21] Appl. No.: 26,386

[30] Foreign Application Priority Data
Apr. 17, 1969 Japan.............................. 44/29347
Sept. 24, 1969 Japan.............................. 44/75278

[52] U.S. Cl................................ 260/364, 260/274
[51] Int. Cl............................................ C09b 15/00
[58] Field of Search..................... 260/364, 378, 274

[56] References Cited
UNITED STATES PATENTS
2,791,587  5/1957  Caliezi et al........................ 260/272
2,805,224  9/1957  Baumann............................. 260/274

OTHER PUBLICATIONS
Venkatarman, The Chemistry of Synthetic Dyes, Vol. II, pp. 981–2, (1952).

*Primary Examiner*—Lorraine A. Weinberger
*Assistant Examiner*—Robert Gerstl
*Attorney*—Christen, Sabol and O'Brien

[57] ABSTRACT

New brown vat dyes prepared by heating a compound of the formula

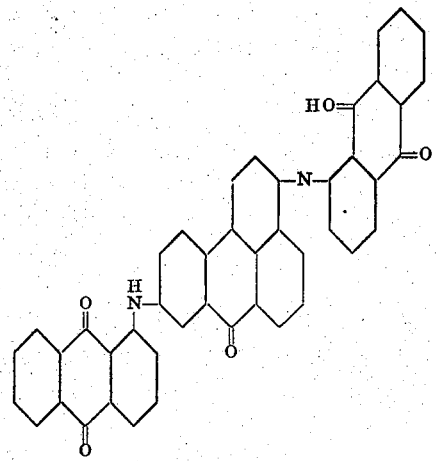

in a melt comprising anhydrous aluminum chloride and urea, pyridine, picoline or lutidine or a combination thereof, if desired, in the presence of a halogenating agent. Said dyes are suitable for dyeing various kinds of fibrous material, but as they can not be directly defined by a structural formula, they are defined by the process for preparing them.

13 Claims, No Drawings

VAT DYES

This invention relates to a new vat dye prepared by heating a compound of the formula 1

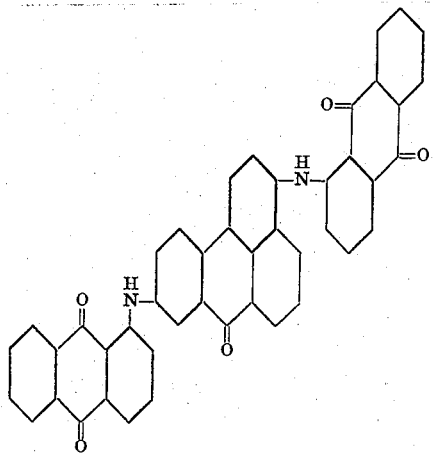

(1)

in a melt comprising anhydrous aluminum chloride and urea, pyridine, picoline or lutidine or a combination thereof, if desired, in the presence of a halogenating agent and to a method of dyeing or printing fibrous materials with the dye.

The fact that fusion of a compound of the formula (1) in a mixture of potassium hydroxide and an alcohol at a temperature of 120°–200°C. affords a vat dye (C.I. Vat Black 25) which dyes cottom in olive color is known through U.S. Pat. No. 1,845,469.

It has now been found that when a compound of the formula 1. is heated at 50°–200°C. in a melt comprising anhydrous aluminum chloride and urea, pyridine, picoline or lutidine or a combination thereof, if desired, in the presence of a halogenating agent, a new vat dye can be obtained which dyes various kinds of fibrous material in fast brown to bluish brown tint.

This dye producing brown to bluish brown tint is quite different from the dye (C.I. Vat Black 25) disclosed in said U.S. patent. As the dye of this invention can not be defined directly by way of a structural formula, however, it is difined by the specified process for preparing same.

The dye of this invention is prepared most preferably by heating 1 part of a compound of the formula 1 at 110°–130°C. in a melt comprising 5–10 parts of anhydrous aluminum chloride and 0.1–3 parts of urea, pyridine, picoline or lutidine or an appropriate combination thereof for several to 10-odd hours or by heating said compound for a short period of time in the melt to which 0.2 of a halogenating agent are added.

When pyridine, picoline or lutidine is employed in the preparation of this dye, the melt will decrease its viscosity and so its treatment will become very easy. Further, the use of a halogenating agent serves not only to promote the reaction but also to adjust the halogen content of the dye, thus making change in color tone of the dye. Adequate as the halogenating agent are sulfuryl chloride, thionyl chloride, etc.

The dyes of this invention afford dyeings of excellent color value not only by the W process which is considered to be suitable for dyeing with a conventional brown vat dye but also by the N process wherein higher alkali concentration and higher dyeing temperature are adopted. This is due to the reason that the dyes of this invention are stable in a chemical bath as compared with conventional brown dyes, and is indeed one of the excellent characteristics of the dyes of this invention.

Any conventional method using vat dyes can be applied to dyeing or printing of fibrous materials with the dyes of this invention. Applicable to the dyes of this invention are a process wherein the dye is converted into its leuco salt or vat acid with a reducing agent such as sodium hydrosulfite or thiourea dioxide and then fibrous materials are dyed or printed with such salt or acid, a process wherein the dye is previously ground together with a dispersing agent into finely divided particles according to a usual manner and the dispersion is applied to fibrous materials and then thermofixed and a process wherein the dye is brought into contact with said reducing agent and reduction and fixation of the dye are simultaneously carried out on the fibrous materials.

When fibrous materials are dyed with the dyes of this invention according to the aforementioned dyeing processes, good reproducible dyeing can be effected without being largely affected by changes in dyeing conditions.

In an ordinary dyeing operation with the dyes of this invention, the result of dyeing is less affected by the variation of the amounts of sodium hydrosulfite as reducing agent and sodium hydroxide, and also by a neutral salt such as sodium sulfate or sodium chloride added to the dye bath. Thus, excellent dyeing can be attained by any of the so-called N process (This process is suitable for using a dye of strong affinity, in which dyeing is carried out at 55°–60°C. with a relatively large amount of sodium hydroxide. A neutral salt is not added to the dye bath.), W process (This process is suitable for using a dye of weak affinity, in which dyeing is carried out at 45°–50°C. with sodium hydroxide in an amount of half as much as the amount in N process. A neutral salt is added to the dye bath to enhance exhaustion.) and K process (This process is suitable for using a dye of weaker affinity, in which dyeing is carried out at 20°–25°C. with sodium hydroxide in an amount smaller than that in W process. The amount of a neutral salt to be added to the dye bath is larger than that in W process.).

Likewise, in the case of applying a pad steam continuous dyeing, the result of dyeing is less influenced by change in the quantities of sodium hydrosulfite, sodium hydroxide, hydrogen peroxide and sodium perborate used.

The dyeings obtained according to this invention possess various characteristics. First, the dyeings having extremely good color rendering (extremely low color change under various illuminations), i.e. a very slight difference between the color tone under the standard illumination of colorimetry - C (daylight) and the color tone under the illumination A (illumination similar to tungsten arc lamp at night). Although the dyeings dyed with Threne Brown R which is comparatively similar to color tone to the dyes of this invention look reddish orange under the illumination A, the dyes of this invention do not show such color change.

It is also one of the characteristics of the dyes of this invention that they possess weak intensity of reflection on radiation of infra-red rays which has begum to be watched recently.

As other characteristics, the dyeings with the dyes of this invention has various kinds of good fastness, especially excellent fastness to resin treatment.

Fibrous materials to which the dyes of this invention can be applied include cellulosic fibers such as cotton, viscose, etc. The dyes of this invention show affinity to silk, wool, nylon, vinylon, etc. basides said cellulosic fibers. In addition, the dyes of this invention also have affinity for polyester fibers which have not been dyed with known vat dyes, when employed according to the thermosol method. In case mixed spun fiber of cottom and polyester is dyed according to the thermosol method using the dyes of this invention, therefore, using a dye for the polyester fiber together will not particularly be necessary.

Thus, the effect or merit achieved by this invention is especially remarkable.

This invention will be illustrated by the following examples wherein all parts are by weight.

EXAMPLE 1

A mixture of 150 parts of anhydrous aluminum chloride, 30 parts of picoline and 3 parts of sulfuryl chloride was heated at 140°–150°C. to melt. To this melt were added at 120°C. 15 parts of a compound of the formula 1 and the whole was stirred for 1 hour at 125°–130°C. The melt was then poured into 2000 parts of water containing 20 parts of concentrated hydrochloric acid and the precipitate formed was filtered and washed with water until the filtrate became neutral to obtain 13.5 parts of a dye containing 1.7 percent chlorine.

0.1 Part of this dye was wetted with 1 part of ethanol and 100 parts of 50°C. were added. Four Parts of 30 percent aqueous solution of sodium hydroxide and 0.8 part of sodium hydrosulfite were added and reduction was carried out at 60°C. for 15 minutes to dissolve the dye. To this solution were further added 3 parts of sodium sulfate and water of 50°C. in an amount to make the whole to 200 parts to prepare a dye bath.

Ten Parts of cottom were dipped into the dye bath, maintained at 50°C. for 30 minutes, squeezed off and then subjected to oxidation and soaping to effect dyeing. The resulting dyeings in brown tint showed various kinds of fastness in the tests described below. (JIS means Japan Industrial Standard)

Tests for fastness:
Light                       JIS L-1044-1959 (carbon arc lamp)
Washing                     JIS L-1045-1959 (MC-3)
Bleaching with hypochlorite JIS L-0856-1967 (strong) (effective chlorine 2g./l)
Soda boiling                JIS L-0864-1965 (no reduction inhibiting agent added)

TEST RESULTS

|  |  | Grade |
|---|---|---|
| Light (medium) |  | 7 |
|  | alteration | 4–5 |
| Washing | staining of cottom | 4–5 |
|  | staining of wool | 5 |
| Bleaching with hypochlorite |  | 4–5 |
|  | alteration | 4 |
| Soda boiling | staining of cottom | 4–5 |

EXAMPLE 2

A mixture of 150 parts of anhydrous aluminum chloride and 30 parts of urea was molted at 200°C. and 3 parts of sulfuryl chloride were added thereto at 110°C. 15 parts of a compound of the formula 1 were then added and the whole was stirred for 1 hour at 125°–130°C. The melt was then worked up as described in Example 1 to obtain 16.8 parts of a dye containing 2.8 percent chlorine.

This dye was incorporated with Demol N (trade name of a product marketed by Kao Sekken K.K. as a dispersing agent) and ground into fine particles. 0.4 Part of the dispersed dye thus obtained was dispersed at 25°C. into 50 parts of water and then 3 parts of 30 percent aqueous solution of sodium hydroxide and 2 parts of Rongalit C were added. The whole was diluted to 200 parts with water of 25°C.

Ten Parts of cottom yarn were dipped into the dye bath and, after elevating the temperature to 60°C. in the course of 10 minutes, 3 parts of sodium sulfate were added thereto. The temperature of the dye bath was then raised to 95–100°C. in the course of 15 minutes and the yarn was maintained at this temperature for 10 minutes and thereafter subjected in a usual manner to oxidation and soaping to effect dyeing.

The resultant dyeings in brown tint had good fastness to sunlight, washing, etc.

EXAMPLE 3

A mixture of 150 parts of anhydrous aluminum chloride and 30 parts of urea was molten at 200°C. and 15 parts of a compound of the formula 1 were added at 125°–130°C. The melt was stirred for 4 hours and then worked up as described in Example 1 to obtain 15.8 parts of a dye containing 0.4 percent chlorine.

This dye was ground into fine particles as described in Example 2 and 0.4 part of the finely ground dye was dispersed into 200 parts of water kept at 25°C. Into this dye dispersion were dipped 10 parts of rayon staple yarn for 5 minutes and thereafter 3 parts of 30 percent aqueous solution of sodium hydroxide and 0.6 parts of sodium hydrosulfite were added. The temperature of the dye bath was raised to 50°–55°C. in the course of 15 minutes and 3 parts of sodium sulfate were added. The yarn was maintained at this temperature for 20 minutes, squeezed off and then subjected in a usual manner to oxidation and soaping to effect dyeing. The resulting dyeings were brown in tint and had good fastness.

EXAMPLE 4

The dye prepared in Example 3 was ground into fine particles as described in Example 2 and 2 parts of the finely ground dye were dispersed into 50 parts of water of 25°C. 10 parts of a 1 percent aqueous solution of sodium alginate were added to the dispersion and then water in an amount sufficient to make the whole to 100 parts was added to prepare a dye dispersion. Cotton cloth was padded at 30°C. in the dispersion, uniformly squeezed off by the aid of a roller, half-dried at 110°C. for 3 minutes and wound on a jigger. The cloth was then wound off and up reciprocally several times in a chemical liquor bath of the composition shown below which was used in an amount of 5 times as much as the weight of the cloth, whereby reduction of the dye was effected. The cloth was then subjected to oxidation and soaping in a usual manner to finish dyeing. As a result, the dyeings in brown tint having good fastness were obtained.

The composition of the chemical liquor (per liter):
30 % aqueous solution of sodium hydroxide 30 cc
sodium hydrosulfite 8 g.
sodium sulfate 30 g.

EXAMPLE 5

A mixture of 150 parts of anhydrous aluminum chloride, 37 parts of urea and 2.5 parts of picoline was molten at 140–150°C. 1.8 Parts of thionyl chloride were added at 110°C. and then 20 parts of a compound of the formula 1 were added. The melt was stirred for 2 hours at 125°–130°C. and then worked up as described in Example 1 to obtain 20.7 parts of a dye containing 2.6 percent chlorine.

This dye was finely divided together with Demol N and then treated as described in Example 4 to prepare a dye dispersion. Cotton cloth was padded in the dye dispersion at 30°C., uniformly squeezed off by the aid of a roller, half-dried at 100°–110°C for 3 minutex, again padded at 30°C. in a bath containing each 30 g. of sodium hydroxide, sodium hydrosulfite and sodium chloride in 1000 parts of water, uniformly squeezed off and immediately subjected to steaming for 35 seconds in saturated steam at 100°–102°C. to effect coloration and then to oxidation followed by soaping. The resultant dyeings were brown in tint and had good fastness.

EXAMPLE 6

The dye obtained in Example 1 was finely divided as described in Example 2 and 5 parts of the resulting paste of the dye were dispersed in 5 parts of water of 25°C. Ninety Parts of a paste were added to the dispersion to prepare a coloring thickening. Cotton cloth was printed with the coloring thickening and, after drying, the printed areas were overprinted by means of a blotch roller with a chemical thickening having the composition shown below and then subjected to steaming for 35 minutes in saturated steam at 100°–102°C. The cloth was subsequently subjected to washing with water, oxidation soaping to finish printing. The dyeings in brown tint having good fastness were thus obtained.

The composition of the chemical thickening (%):
thickening agent 65
30 percent aqueous solution of sodium hydroxide 27
sodium hydrosulfite 8

EXAMPLE 7

A mixture of 150 parts of anhydrous aluminum chloride and 30 parts of picoline was molten at 140°–150°C. and 15 parts of a compound of the formula 1 were added at 130°135°C. The melt was stirred at the same temperature for 2.5 hours and then worked up as described in Example 1 to obtain 14.6 parts of a dye containing 0.4 percent chlorine.

This dye was finely ground as described in Example 2 and 5 parts of the resulting paste of the dye were dispersed into 10 parts of water of 25°C. 85 Parts of a thickening having the composition shown below were added to the dispersion to prepare a coloring thickening.

Cotton cloth was printed with the coloring paste and, after drying, subjected to steaming at 100°–120°C. for 10 minutes in saturated steam, washing with water, oxidation and soaping to finish printing. The dyeings thus obtained was bluish brown in tint and had good fastness.

The composition of the thickening:
thickening agent 50 parts
water 5 parts
glycerol 8 parts
potassium carbonate 12 parts
Rongalit C 10 parts

EXAMPLE 8

Cotton cloth was printed with a cloring thickening containing the finely ground dye prepared in Example 3 and having the under-mentioned composition and then dried at 50°C. The cloth was subjected successively to steaming for 10 minutes at 100°–102°C. with saturated steam, washing with water, oxidation and then soaping to obtain the dyeings in brown tint having good fastness.

The composition of the coloring paste (%):
the finely ground dye 2
glycerol 4
British gum thickening (1:1) 60
40° Be sodium hydroxide solution 4
sodium hydrosulfite 2
potassium carbonate 8
water 8
Rongalit C (1:1) 12

EXAMPLE 9

Using the dye of Example 7, a dye dispersion was prepared as described in Example 4. Polyester fabric was padded at 30°C. with the dye dispersion, uniformly squeezed off by the aid of a roller and half-dried at 100°–110°C. for 3 minutes. The fabric was then treated in a drier at 200°C. for 2 minutes and subjected to soaping to effect dyeing. The dyeings thus obtained were bluish brown in tint and had good fastness.

EXAMPLE 10

Using a finely ground dye obtained by treating the dye prepared in Example 1 in a manner similar to that described in Example 2, polyester fiber/cotton mixed spun fabric was treated by the thermosol method according to Example 9 and then subjected to pad steam dyeing as described in Example 5 to obtain the dyeings in which polyester fiber and cottom were dyed in brown tint of the same strength.

0.1 Part of the dye obtained in Example 5 was wetted with 1 part of ethanol. To the wetted dye were added 50 parts of water of 55°C. and 2 parts of a 30 percent aqueous solution of sodium hydroxide. 0.6 Part of sodium hydrosulfite was then added and the temperature was maintained at 55°C. for 15 minutes to effect reduction of the dye. One thousand Parts of water kept at 25°C. and 1 part of Demol N were added and the mixture was neutralized to pH 7 with acetic acid to prepare a dispersion of the vat acid. Water was added to the dispersion to adjust the total amount to 200 parts. 10 Parts of cotton were dipped into the dispersion, uniformly squeezed off, treated at 60°C. for 10 minutes in 200 parts of a chemical liquor of the under-mentioned composition and then subjected to oxidation followed by soaping whereby dyeing of the cotton was effected.

The dyeings thus obtained were brown in tint and had good fastness.

The composition of the chemical liquor (per liter):
30 percent aqueous solution of sodium hydroxide 5 cc
sodium hydrosulfite 0.5 g.
sodium sulfate 20 g.

EXAMPLE 12

A mixture of 150 parts of anhydrous aluminum chloride, 37 parts of urea and 2.5 parts of pyridine was heated at 140–150°C. to melt. 1.8 Parts of thionyl chloride were added at 110°C. to the mixture and then 20 parts of a compound of the formula (1) were added and the whole was stirred for 2 hours at 125°–130°C. The melt was treated in a manner similar to that described in Example 1 to obtain 21 parts of a dye containing 2.6 percent chlorine.

One part of this dye was wetted with 5 parts of ethanol. To the wetted dye were added 60 parts of water of 55°C. and 8 parts of a 30 percent aqueous solution of sodium hydroxide. 2 Parts of sodium hydrosulfite was then added, while the temperature was maintained at 55°C., and reduction of the dye was carried out for 15 minutes. Twenty Parts of water and 1.5 parts of Demol N were added and the mixture was neutralized to pH 7 with acetic acid. Water was then added to the mixture to adjust the total quantity to 100 parts whereupon a dispersion of the vat acid was prepared.

Rayon fabric was padded at 30°C. with the dispersion of the vat acid, uniformly aqueezed off by the aid of roller and wound on a jigger. The rayon fabric was then wound off and up reciprocally several times at 60°C. in a chemical liquor bath of the under-mentioned composition which was used in an amount of 5 times as much as the weight of the fabric, whereby redction of the dye was effected. The fabric was subjected in a usual manner to oxidation and soaping to finish dyeing. The dyeings thus obtained were brown in tint and had good fastness.

The composition of the chemical liquor (per liter):
30 % aqueous solution of sodium hydroxide 10 cc
sodium hydrosulfite 2 g.
sodium sulfate 30 g.

EXAMPLE 13

Cotton cloth was padded with 1000 parts of a dispersion of the vat acid of Example 12, to which 1 part of sodium alginate had been added, and then half-dried at 100°C. for 3 minutes. The cotton cloth was again padded at 30°C. with 1000 parts of a chemical liquor containing each 25 parts of sodium hydroxide, sodium hydrosulfite and sodium chloride, uniformly squeezed off and immediately subjected to steaming for 40 seconds in saturated steam at 100°C., whereby coloration was effected. The cloth was then brought to oxidation and soaping, and thus the dyeings in brown tint having good fastness were obtained.

EXAMPLE 14

A mixture of 150 parts of anhydrous aluminum chloride, 30 parts of lutidine and 3 parts of sulfuryl chloride was heated at 140°–150°C. form a melt. Fifteen Parts of a compound of the formula 1 were added at 120°C. and the mixture was stirred for 1 hour at 125°–130°C. and worked up as described in Example 1 to obtain 15.3 parts of a dye containing 1.7 percent chlorine.

This dye was treated in a manner similar to that described in Example 4 to prepare a dispersion of the dye. Cotton cloth was padded at 30°C. with the dye dispersion and then passed at 95°C. through a chemical liquor of the under-mentioned composition to effect reduction of the dye and washed with water. The cloth was then subjected successively to oxidation, washing with water, soaping, washing with water and then drying to obtain the dyeings in brown tint having good fastness.

The composition of the chemical liquid (per liter):
30 % aqueous solution of sodium hydroxide 30 cc
sodium hydrosulfite 6 g.

EXAMPLE 15

0.2 Part of the dye obtained in Example 2 was wetted with 1 part of Turkey red oil. 47 Parts of water and 1.5 parts of 30 percent aqueous solution of sodium hydroxide were added and the mixture was heated at 55°C. To this mixture was added 0.6 part of hydrosulfite and reduction of the dye was effected at this

What is claimed is:

1. A method for obtaining a dye which comprises heating 1 part of a compound of the formula

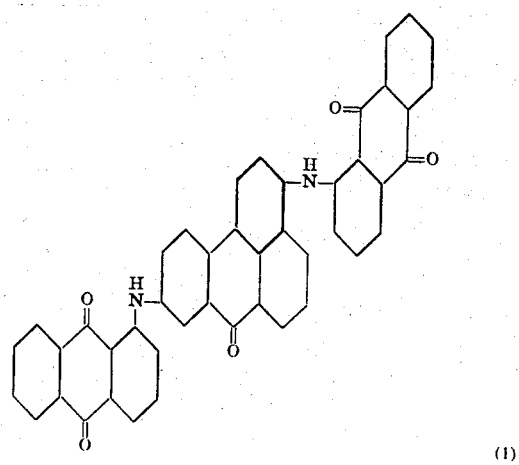

(1)

in a melt comprising from 5 to 10 parts anhydrous aluminum chloride and from 0.1 to 3 parts of a member selected from the group consisting of urea, pyridine, picoline, lutidine and mixtures thereof for from about 1 to 10 hours at a temperature of from 50° to 200°C., and separating the dye from said melt.

2. A method according to claim 1 wherein the melt contains urea.

3. A method according to claim 1 wherein the melt contains picoline.

4. A method according to claim 1 wherein the heating is conducted at a temperature of from 110°C to 130°C.

5. A dye obtained according to the process of claim 1.

6. A method according to claim 1 wherein the melt contains up to 0.2 parts of a halogenating agent.

7. A method according to claim 6 wherein the heating is conducted at a temperature of from 110°C. to 130°C.

8. A method according to claim 6 wherein the melt contains picoline and the halogenating agent is sulfuryl chloride.

9. A method according to claim 6 wherein the melt contains urea and the halogenating agent is sulfuryl chloride.

10. A method according to claim 6 wherein the melt contains urea and picoline and the halogenating agent is thionyl chloride.

11. A method according to claim 6 wherein the melt contains urea and pyridine and the halogenating agent is thionyl chloride.

12. A method according to claim 6 wherein the melt contains lutidine and the halogenating agent is sulfuryl chloride.

13. A dye obtained according to the process of claim 6.

* * * * *